United States Patent
Zhu et al.

(10) Patent No.: US 7,019,996 B2
(45) Date of Patent: Mar. 28, 2006

(54) POWER CONVERTER EMPLOYING A PLANAR TRANSFORMER

(75) Inventors: Lizhi Zhu, Canton, MI (US); John M. Van Dyke, Plymouth, MI (US); Richard J. Hampo, Plymouth, MI (US)

(73) Assignee: Ballard Power Systems Corporation, Dearborn, MI (US)

( * ) Notice: Subject to any disclaimer, the term of this patent is extended or adjusted under 35 U.S.C. 154(b) by 189 days.

(21) Appl. No.: 10/688,834

(22) Filed: Oct. 16, 2003

(65) Prior Publication Data

US 2005/0083714 A1    Apr. 21, 2005

(51) Int. Cl.
    H02M 1/00    (2006.01)
(52) U.S. Cl. .................. 363/144; 363/141; 361/709; 361/719; 361/836
(58) Field of Classification Search .............. 363/17, 363/141, 144, 147; 361/709, 717–719, 781, 361/783, 836
    See application file for complete search history.

(56) References Cited

U.S. PATENT DOCUMENTS

| | | | | |
|---|---|---|---|---|
| 4,803,609 A * | 2/1989 | Gillett et al. | ................ | 363/17 |
| 4,868,732 A * | 9/1989 | Gillett et al. | ................ | 363/90 |
| 5,610,449 A * | 3/1997 | Takahashi et al. | ............ | 307/43 |
| 5,973,923 A | 10/1999 | Jitaru | ..................... | 361/704 |
| 6,038,156 A | 3/2000 | Inam et al. | ................ | 363/133 |
| 6,144,276 A | 11/2000 | Booth | ..................... | 336/61 |
| 6,147,583 A * | 11/2000 | Rinne et al. | ............... | 336/200 |
| 6,212,086 B1 * | 4/2001 | Dinh | ..................... | 363/144 |
| 6,278,354 B1 | 8/2001 | Booth | ..................... | 336/200 |
| 6,515,858 B1 * | 2/2003 | Rodriguez et al. | ......... | 361/695 |
| 6,707,284 B1 * | 3/2004 | Lanni | ..................... | 323/297 |
| 6,740,968 B1 * | 5/2004 | Matsukura et al. | ........ | 257/707 |
| 6,862,195 B1 * | 3/2005 | Jitaru | .................... | 363/17 |
| 6,944,033 B1 * | 9/2005 | Xu et al. | ................... | 363/16 |
| 2002/0080627 A1 * | 6/2002 | Baretich et al. | ............ | 363/25 |

OTHER PUBLICATIONS

Boroyevich, D., et al., "A View at the Future of Integration in Power Electronics Systems," in *Proceedings of the PCIM Europe 2005,* Nuremberg, Germany, Jun. 7, 2005, pp.11-20.
Lee, F., et al., "Technology Trends Toward a System-in-a-Module in Power Electronics," *IEEE Circuits and Systems Magazine,* 2(4):4-23, Fourth Quarter 2002.

\* cited by examiner

*Primary Examiner*—Gary L Laxton
(74) *Attorney, Agent, or Firm*—Seed IP Law Group PLLC

(57) ABSTRACT

A power converter may employ a planar transformer to minimize winding conduction loss, and the switching devices of the power converter may be aligned in lines parallel to an edge of the planar transformer to minimize the termination leakage inductance. The windings of the planar transformer may be thermally conductively coupled to one or more heat sinks carried by a circuit board which are with respective ones of the switching devices, to provide a cooling path for the planar transformer.

44 Claims, 8 Drawing Sheets

POWER CONVERTER EMPLOYING A PLANAR TRANSFORMER

BACKGROUND OF THE INVENTION

1. Field of the Invention

This disclosure is generally related to electrical power systems, and more particularly to power converter architectures suitable for rectifying, inverting and/or converting electrical power between power sources and loads.

2. Description of the Related Art

Power converters are devices that typically transform and/or condition power from one or more power sources to supply power to one or more loads. Power converters commonly referred to as "inverters" transform direct current (DC) to alternating current (AC), for example, to supply power from a DC source to an AC load. Power converters commonly referred to as "rectifiers" transform AC to DC, for example, to supply power from an AC source to a DC load. Power converters commonly referred to as "DC/DC converters" step-up or step-down a DC voltage. Some power converters combine two or more of these functions, for example, first rectifying an AC input, then inverting the resulting DC to produce an AC output. An appropriately configured and operated power converter may perform any one or more of these functions. Thus, the term "converter" is commonly applied generically to all power converters whether inverters, rectifiers, and/or DC/DC converters.

A power converter may employ a transformer, for example a planar transformer, to provide galvanic isolation between an input or primary side and an output or secondary side of the power converter. Connection between an input or primary side and an output or secondary side of the power converter may result in a substantial leakage inductance and may result in significant losses and/or switching noises.

Efficiency is important in power converter design, and may be the difference between a commercially successful product and an unsuccessful product. Efficiency is also important to for environmental reasons, as well as extending product life and reducing product cost, as well as operating costs. Termination leakage and winding conduction loss plague many power converter designs, reducing efficiency and resulting in thermal problems. Optimizing leakage inductance is advantageous.

Another significant problem in power converter design is thermal management, particularly for the windings of planar transformers. An additional problem faced by some power converter designs is the inclusion of a wire harness for internal power connections, which increases cost, adds to connection losses, occupies valuable space, and provides an additional point of failure.

Thus, there is a need for a converter design that minimizes termination leakage inductance and winding conduction loss. There is a further need for a converter design that provides enhanced cooling of a transformer.

BRIEF SUMMARY OF THE INVENTION

In one aspect, a power converter comprises a circuit board; a planar transformer physically coupled to the circuit board, the planar transformer comprising a primary side and a secondary side and having at least a first edge and a second edge opposed to the first edge; a first set of switching devices forming a first full bridge circuit comprising a first, a second, a third and a fourth branch of the first full bridge circuit, at least one switching device in each branch mounted on the circuit board along at least a portion of the first edge of the planar transformer wherein the first and the second branch form a first leg of the first full bridge circuit and the third and the fourth branches form a second leg of the first full bridge circuit, and the switching devices of the first full bridge circuit are linearly arranged and ordered such that the switching devices in the first leg are successively adjacent one another and the switching devices in the second leg are successively adjacent one another; and a second set of switching devices forming a second full bridge circuit comprising a first, a second, a third and a fourth branch of the second full bridge circuit, at least a first switching device in each branch mounted on the circuit board along at least a portion of the second edge of the planar transformer.

In another aspect, a power converter comprises a circuit board; a planar transformer physically coupled to the circuit board, the planar transformer comprising a primary side and a secondary side and having at least a first edge and a second edge opposed to the first edge; and a first full bridge circuit comprising a left half upper branch, a left half lower branch, a right half upper branch and a right half lower branch, the left half upper branch comprising at least a first left half upper branch switching device, the left half lower branch comprising at least a first left half lower branch switching device, the right half upper branch comprising at least a first right half upper branch switching device and the right half lower branch comprising at least a first right half lower branch switching device, each of the first left half upper branch switching device, the first left half lower branch switching device, the first right half upper branch switching device and the first right half lower branch switching device of the first full bridge circuit are carried by the circuit board in a first primary side line extending parallel to the first edge of the planar transformer.

In yet another aspect, a method of forming a power converter comprises mounting a planar transformer to a circuit board, the planar transformer having a primary, a secondary, and at least a first edge and a second edge; and mounting at least a first left half upper branch switching device, a first left half lower branch switching device, a first right half upper branch switching device and a first right half lower branch switching device on the circuit board in a line extending parallel to the first edge of the planar transformer, the first left half upper branch switching device, the first left half lower branch switching device, the first right half upper branch switching device and the first right half lower branch switching device electrically coupled to form a first full bridge circuit electrically coupled to the primary of the planar transformer.

In a further aspect, a power converter comprises a circuit board; a planar transformer carried by the circuit board, the planar transformer comprising a primary side of a number of planar primary windings and a secondary side of a number of planar secondary windings; a first set of switching devices carried by the circuit board and electrically coupled to form a first bridge circuit, the first set of switching devices electrically coupled to the primary side of the planar transformer; and a first set of heat sink structures carried by the circuit board and located proximate respective ones of the switching devices in the first set of switching devices, at least a number of the heat sink structures thermally conductively coupled to at least one of the number of planar primary windings.

In yet a further aspect, a power converter comprises a circuit board; a planar transformer carried by the circuit board, the planar transformer comprising a number of planar primary windings and a number of planar secondary windings; a first set of switching devices carried by the circuit board and electrically coupled to form a circuit, the first set of switching devices electrically coupled to the planar primary windings of the planar transformer; a second set of switching devices carried by the circuit board and electrically coupled to form a second circuit, the second set of switching devices electrically coupled to the planar secondary windings of the planar transformer; and a number of heat sink structures carried by the circuit board and located proximate respective ones of the switching devices in the first and the second sets of switching devices, a first number of the heat sink structures proximate the first set of switching devices thermally conductively coupled to at least one of the number of the planar primary windings and a second number of the heat sink structures proximate the second set of switching devices thermally conductively coupled to at least one of the number of the planar secondary windings.

In still a further aspect, a method of forming a power converter comprises mounting a planar transformer to a circuit board, the planar transformer having a planar primary windings, a planar secondary windings, and at least a first edge and a second edge; mounting a first set of switching devices to the circuit board, the first set of switching devices coupled to the planar primary windings of the planar transformer; mounting a second set of switching devices to the circuit board, the second set of switching devices coupled to the planar secondary windings of the planar transformer; mounting a number of heat sink structures to the circuit board proximate a respective ones of the switching devices in the first and the second sets of switching devices, a first number of the heat sink structures proximate the first set of switching devices thermally conductively coupled to at least one of the number of the planar primary windings and a second number of the heat sink structures proximate the second set of switching devices thermally conductively coupled to at least one of the number of the planar secondary windings.

The present design for a converter design employs a planar transformer, and may minimize termination leakage inductance and winding conduction losses. The present design for a converter may also provide enhanced cooling of a transformer, by providing a cooling path from a set of planar windings to heat sinks associated with the switching devices. Other advantages will become apparent from the teachings herein to those of skill in the art.

BRIEF DESCRIPTION OF THE DRAWING(S)

In the drawings, identical reference numbers identify similar elements or acts. The sizes and relative positions of elements in the drawings are not necessarily drawn to scale. For example, the shapes of various elements and angles are not drawn to scale, and some of these elements are arbitrarily enlarged and positioned to improve drawing legibility. Further, the particular shapes of the elements as drawn, are not intended to convey any information regarding the actual shape of the particular elements, and have been solely selected for ease of recognition in the drawings.

DETAILED DESCRIPTION OF THE INVENTION

In the following description, certain specific details are set forth in order to provide a thorough understanding of various embodiments of the invention. However, one skilled in the art will understand that the invention may be practiced without these details. In other instances, well-known structures associated with power converters, gate drives, and converter controllers have not been shown or described in detail to avoid unnecessarily obscuring descriptions of the embodiments of the invention.

Unless the context requires otherwise, throughout the specification and claims which follow, the word "comprise" and variations thereof, such as, "comprises" and "comprising" are to be construed in an open, inclusive sense, that is as "including, but not limited to."

Reference throughout this specification to "one embodiment" or "an embodiment" means that a particular feature, structure or characteristic described in connection with the embodiment is included in at least one embodiment of the present invention. Thus, the appearances of the phrases "in one embodiment" or "in an embodiment" in various places throughout this specification are not necessarily all referring to the same embodiment. Further more, the particular features, structures, or characteristics may be combined in any suitable manner in one or more embodiments.

The headings provided herein are for convenience only and do not interpret the scope or meaning of the claimed invention.

Figure 1:
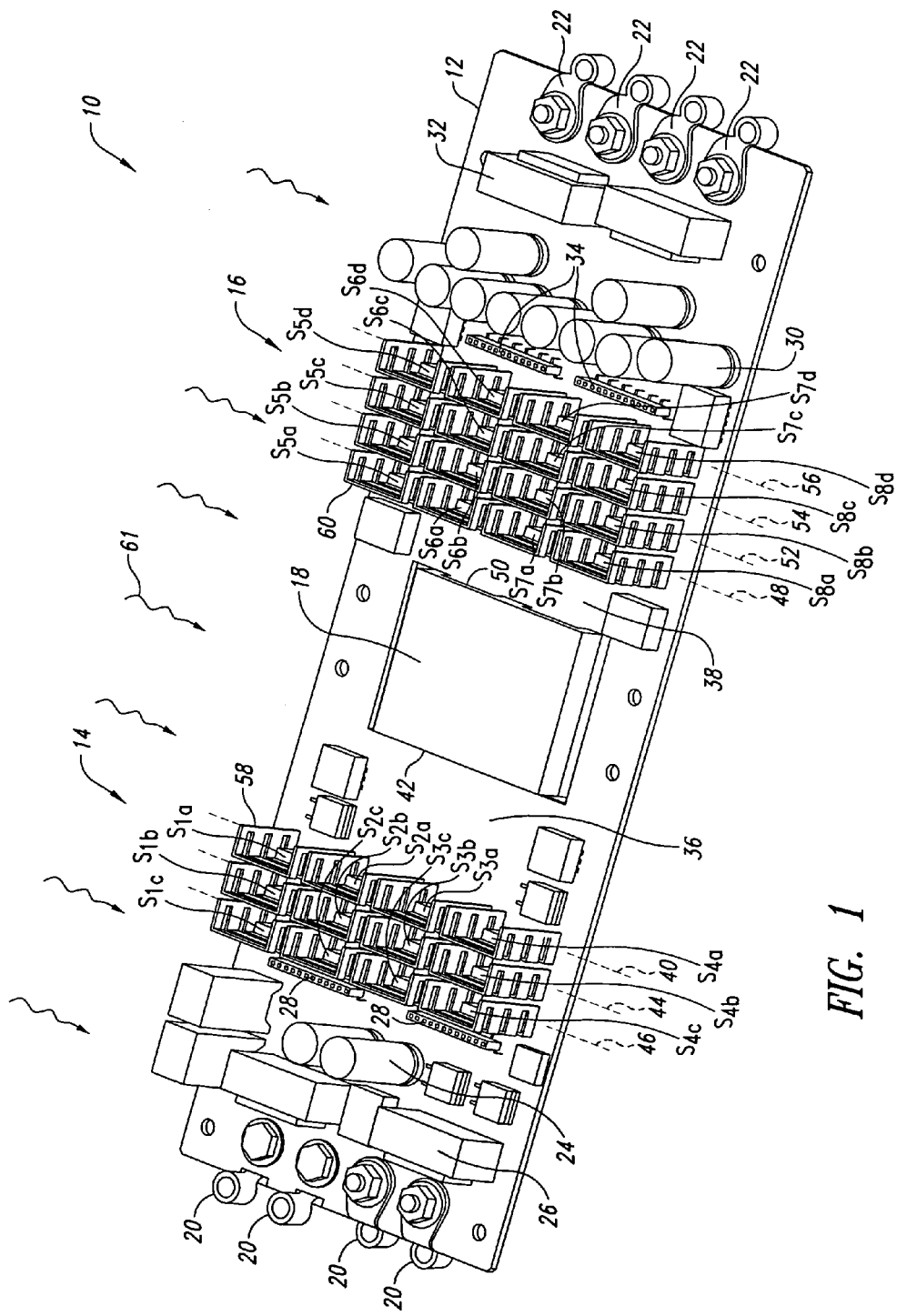
FIG. 1 is an isometric view of a power converter comprising a circuit board, primary side switching devices, secondary side switching devices, planar transformer, and a variety of other electrical and electronic components according to one illustrated embodiment.
Figure 2:
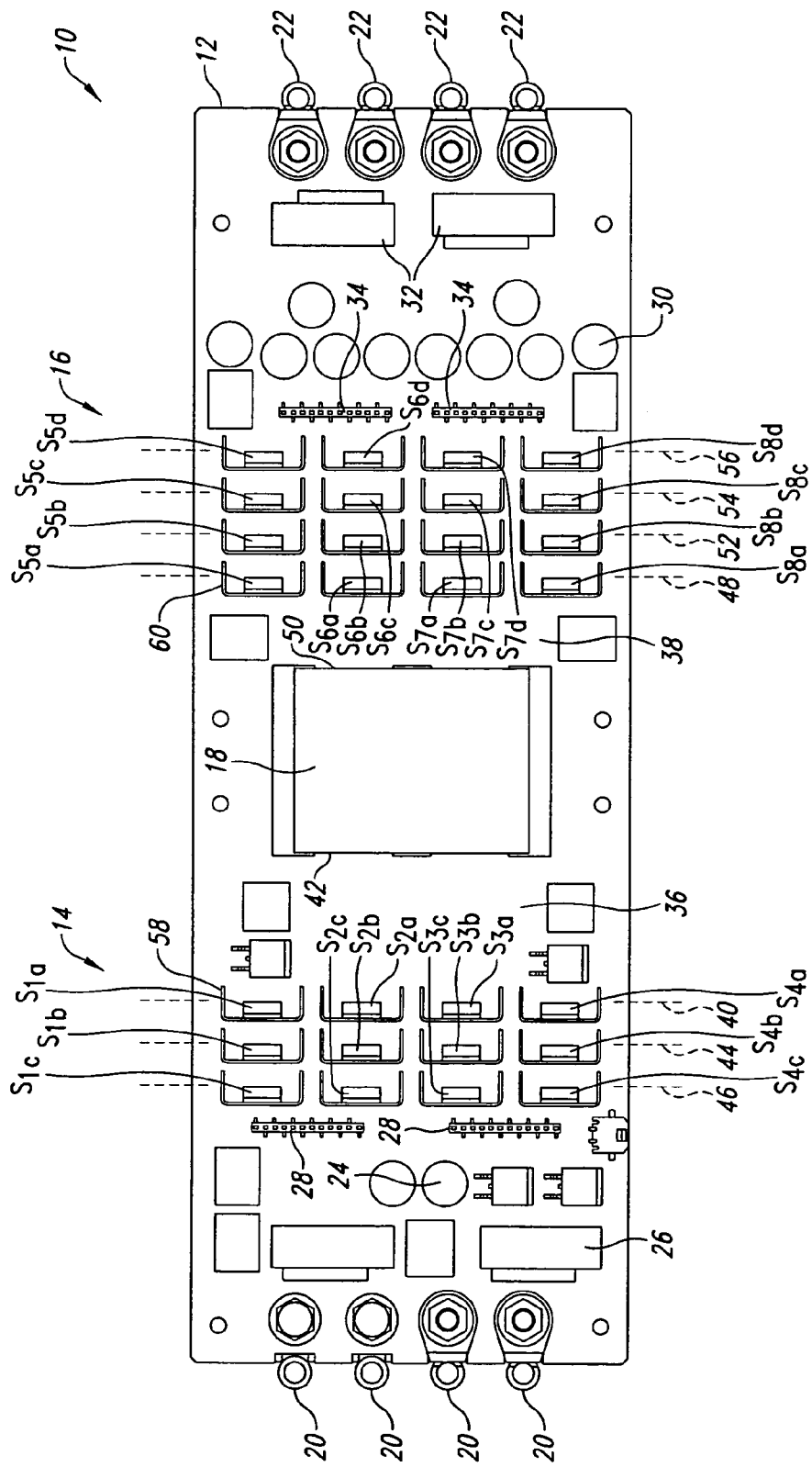
FIG. 2 is a top plan view of the converter of FIG. 1.
Figure 3:
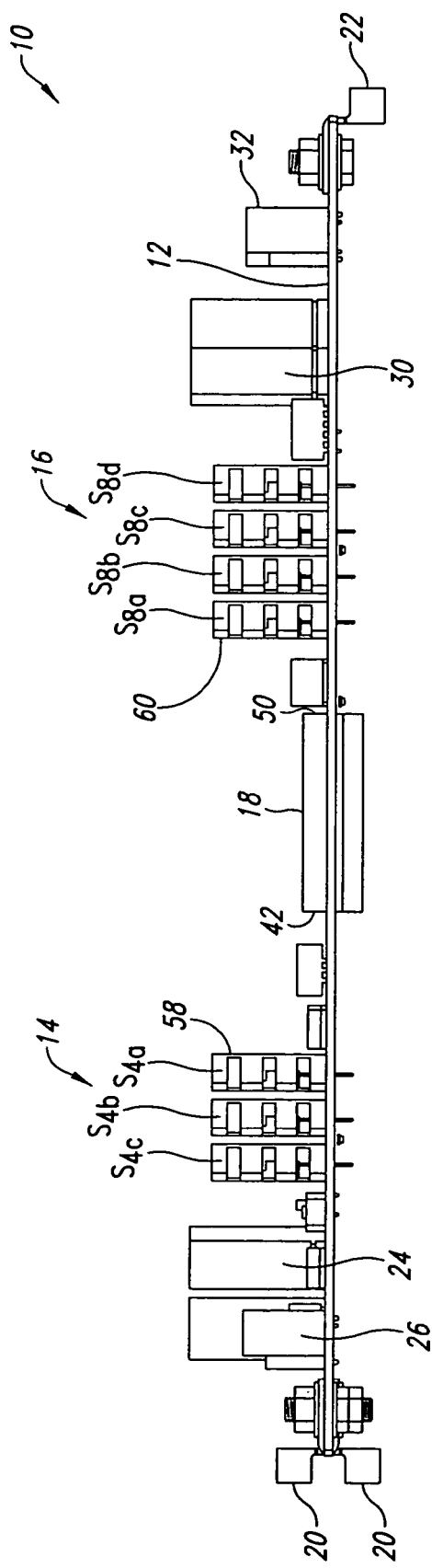
FIG. 3 is a side elevational view of the converter of FIG. 1.

FIGS. 1–3 show a power converter 10 comprising a circuit board 12 carrying a first or primary set of switching devices 14, a second or secondary set of switching device 16 and a transformer such as a planar transformer 18 electrically coupled between the primary and secondary sets of switching devices 14, 16, respectively. The power converter 10 further comprises a set of input terminals such as input ring terminals 20 and a set of output terminals such as output ring terminals 22.

On the primary side 14, the power converter 10 includes one or more input filter capacitors 24 and one or more input current sensors 26. The primary side 14 may also include one or more gate drive connectors 28 to provide gate drive signals to switching terminals of the switching devices of the primary set of switching devices 14.

The secondary side 16 of the power converter 10 includes one or more output filter capacitors 30 and one or more output current sensors 32. The secondary side 16 may also include one or more gate drive connectors 34 to provide gate drive signals to switching terminals of the switching devices of the secondary set of switching devices 16.

Figure 4:
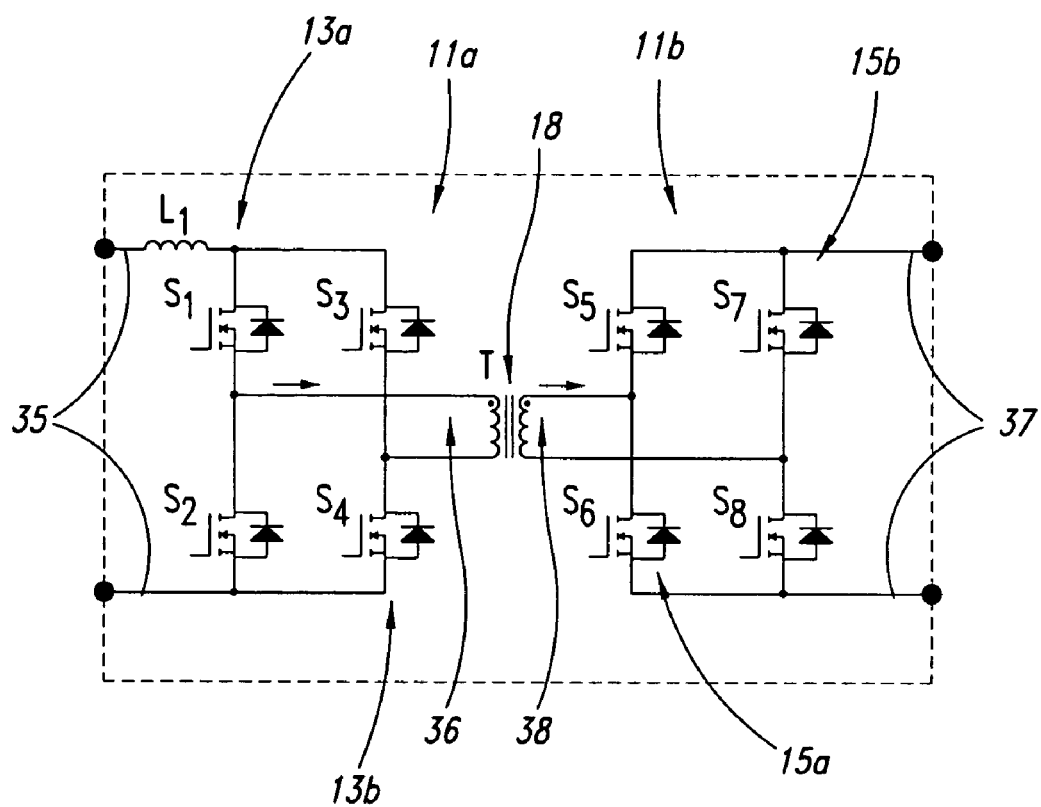
FIG. 4 is an electrical schematic illustrating an exemplary coupling of the switching devices of the converter of FIG. 1 as a full-bridge boost converter.

FIG. 4 shows one possible embodiment with the primary and secondary switching devices 14, 16 configured as an isolated full-bridge boost converter. The primary side 14 of the power converter 10 includes a first full bridge 11a (i.e., switching devices $S_1$, $S_2$, $S_3$, $S_4$ such as transistors and associated diodes) comprising two legs or half-bridges such as a left leg or half-bridge 13a and a right leg or half-bridge 13b, where each leg or half-bridge 13a, 13b is formed by a pair of switching devices $S_1$, $S_2$ and $S_3$, $S_4$. Each pair of switching devices $S_1$, $S_2$ and $S_3$, $S_4$ is electrically coupled between the positive and negative rails of a primary side voltage bus 35, one of the switching devices in each pair is denominated as the high switching device (i.e., $S_1$, $S_3$), and the other switching device in each pair is denominated as the low switching device (i.e., $S_2$, $S_4$). The poles of a primary winding 36 of the transformer 18 are electrically coupled between the respective switching device pairs $S_1$, $S_2$ and $S_3$, $S_4$ of the first full bridge 11a.

The primary side 14 of the power converter 10 further includes a boost inductor $L_1$ electrically coupled in series on the positive rail of the primary side voltage bus 35. The input capacitors 24 may be electrically coupled across the primary side voltage bus 35.

The secondary side 16 of the power converter 10 includes a second full bridge 11b (i.e., switching devices $S_5$, $S_6$, $S_7$, $S_8$ such as transistors and associated diodes) comprising two legs or half-bridges such as a left leg or half-bridge 15a and a right leg or half-bridge, 15b, where each leg or half-bridge 15a, 15b is formed by a pair of switching devices $S_5$, $S_6$ and $S_7$, $S_8$. Each pair of switching devices $S_5$, $S_6$ and $S_7$, $S_8$ is electrically coupled between the positive and negative rails of a secondary side voltage bus 37, one of the switching devices in each pair is denominated as the high switching device (i.e., $S_5$, $S_7$) and the other switching device in each pair is denominated as the low switching device (i.e., $S_6$, $S_8$). The poles of a secondary winding 38 of the transformer 18 are electrically coupled between respective pairs of the switching devices $S_5$, $S_6$ and $S_7$, $S_8$ of the second full bridge 11b The switching device $S_1$–$S_8$ may take the form of integrated bipolar transistors (IGBTs) or other suitable switching devices, for example metal oxide semiconductor field effect transistors (MOSFETs) with their associated body diodes (i.e., inherent in MOSFETs). IGBTs are commercially available, typically in pairs or in sets of six IGBTs with a respective diode coupled in anti-parallel across each of the IGBTs. The switching devices $S_1$–$S_8$ are driven via a gate drive (not shown) which may be part of the power converter 10 or may be separately provided. Control logic may be implemented in hardware and/or software, for example, the control logic may be implemented in a DC/DC controller (not shown) such as a microprocessor.

While FIG. 4 illustrates each branch of each of the full bridges as comprising a single switching device $S_1$–$S_8$, the power converter 10 may employ multiple electrically paralleled switching devices in each branch. For example, with reference to FIGS. 1–3, each branch of the first full bridge comprises three switching devices (i.e., Branch 1: $S_{1a}$, $S_{1b}$, $S_{1c}$; Branch 2: $S_{2a}$, $S_{2b}$, $S_{2c}$; Branch 3: $S_{3a}$, $S_{3b}$, $S_{3c}$; and Branch 4: $S_{4a}$, $S_{4b}$, $S_{4c}$) the switching device in each branch electrically coupled in parallel. Similarly, each branch of the second full bridge comprises three switching devices (i.e., Branch 1: $S_{5a}$, $S_{5b}$, $S_{5c}$, $S_{5d}$; Branch 2: $S_{6a}$, $S_{6b}$, $S_{6c}$, $S_{6d}$; Branch 3: $S_{7a}$, $S_{7b}$, $S_{7c}$, $S_{7d}$; and Branch 4: $S_{8a}$, $S_{8b}$, $S_{8c}$, $S_{8d}$) the switching devices in each branch electrically coupled in parallel.

On the primary side 14, a first switching device $S_{1a}$, $S_{2a}$, $S_{3a}$, $S_{4a}$ from each branch is mounted on the circuit board 12 in a first primary side line 40, extending parallel to a first edge 42 of the planar transformer 18. Likewise, a second switching device $S_{1b}$, $S_{2b}$, $S_{3b}$, $S_{4b}$ from each branch is mounted to the circuit board 12 in a second primary side line 44 extending parallel to the first primary side line 40 and spaced outwardly therefrom with respect to the first edge 42. Likewise a third switching device $S_{1c}$, $S_{2c}$, $S_{3c}$, $S_{4c}$ from each branch is mounted in a third primary side line 46 extending parallel to the second primary side line 44 and spaced outwardly therefrom with respect to the first edge 42.

Along the respective primary side lines 40, 44, 46, the switching devices $S_1$–$S_4$ are ordered along the first edge 42 such that the switching devices $S_1$ and $S_2$ comprising the first pair of switching devices (i.e., first half bridge) are adjacent one another, and the switching devices $S_3$ and $S_4$ comprising the second pair of switching devices (i.e., second half bridge) are adjacent one another, in order to minimize the length of the connections between the outputs nodes of the respective half bridges and the primary winding 36 of the planar transformer 18.

Thus, the switching devices $S_1$, $S_2$, $S_3$, $S_4$ are linearly arranged and ordered such that the switching devices $S_1$, $S_2$ in the first leg 13a are immediately adjacent one another and the switching devices $S_3$, $S_4$ in the second leg 13b are immediately adjacent one another. Alternatively, the switching devices $S_1$, $S_2$, $S_3$, $S_4$ are arranged such that at least one of a) both of the first and the second upper switches $S_1$, $S_3$ are not adjacent each other and b) both of the first and the second lower switching devices $S_2$, $S_4$ are not adjacent each other. Thus, for example, where switching devices $S_1$, and $S_3$ are upper switching devices and switching devices $S_2$, and $S_4$ are lower switching devices, suitable orders for the switching device $S_1$–$S_4$ along the primary side lines 40, 44, 46 include:

TABLE 1

| | |
|---|---|
| $S_1$, $S_2$, $S_3$, $S_4$ | $S_3$, $S_4$, $S_1$, $S_2$ |
| $S_1$, $S_2$, $S_4$, $S_3$ | $S_3$, $S_4$, $S_2$, $S_1$ |
| $S_2$, $S_1$, $S_3$, $S_4$ | $S_4$, $S_3$, $S_1$, $S_4$ |
| $S_2$, $S_1$, $S_4$, $S_3$ | $S_4$, $S_3$, $S_2$, $S_1$ |

On the secondary side 16, a first switching device $S_{5a}$, $S_{6a}$, $S_{7a}$, $S_{8a}$ from each branch is mounted to the circuit board 12 along a first secondary side line 48 parallel to a second edge 50 of the planar transformer 18 where the second edge 50 is opposed to the first edge 42. Likewise, a second switching device $S_{5b}$, $S_{6b}$, $S_{7b}$, $S_{8b}$ in each branch is mounted to the circuit board along a second secondary side line 52, parallel to the first secondary side line 48 and spaced outwardly therefrom with respect to the second edge 50. Similarly, a third switching device $S_{5c}$, $S_{6c}$, $S_{7c}$, $S_{8c}$ in each branch is mounted along a third secondary side line 54, parallel to the second secondary side line 52 and spaced outwardly therefrom with respect to the second edge 50. Further, a fourth switching device $S_{5d}$, $S_{6d}$, $S_{7d}$, $S_{8d}$ from each branch is mounted on the circuit board 12 along a fourth secondary side line 56, parallel to the third secondary side line 54 and spaced outwardly therefrom with respect to the second edge 50.

Along the respective secondary side lines 48, 52, 54, 56, the switching devices $S_5$–$S_8$ are ordered along the first edge 42 such that the switching devices $S_5$ and $S_6$ comprising the first pair of switching devices (i.e., first half bridge) are adjacent one another, and the switching devices $S_7$ and $S_8$ comprising the second pair of switching devices (i.e., second half bridge) are adjacent one another, in order to minimize the length of the connections between the outputs nodes of the respective half bridges and the secondary winding 38 of the planar transformer 18.

Thus, the switching devices $S_5$, $S_6$, $S_7$, $S_8$ are linearly arranged and ordered such that the switching devices $S_5$, $S_6$ in the first leg 15a are immediately adjacent one another and the switching devices $S_7$, $S_8$ in the second leg 15b are immediately adjacent one another. Alternatively, the switching devices $S_5$, $S_6$, $S_7$, $S_8$ are arranged such that at least one of a) both of the first and the second upper switching devices $S_5$, $S_7$ are not adjacent each other and b) both of the first and the second lower switching devices $S_6$, $S_8$ are not adjacent each other. Thus, for example, where switching devices $S_5$, and $S_7$ are upper switching devices and switching devices $S_6$, and $S_8$ are lower switching devices, suitable orders for the switching devices $S_5$–$S_8$ along the secondary side lines 48, 52, 54, 56 include:

TABLE 2

| | |
|---|---|
| $S_5$, $S_6$, $S_7$, $S_8$ | $S_7$, $S_8$, $S_5$, $S_6$ |
| $S_5$, $S_6$, $S_8$, $S_7$ | $S_7$, $S_8$, $S_6$, $S_5$ |
| $S_6$, $S_5$, $S_7$, $S_8$ | $S_8$, $S_7$, $S_5$, $S_8$ |
| $S_6$, $S_5$, $S_8$, $S_7$ | $S_8$, $S_7$, $S_6$, $S_5$ |

The power converter 10 includes a first number of heat sinks (collectively referenced as 58), each of the heat sinks 58 positioned proximate a respective one of the switches $S_1$–$S_4$. The power converter 10 also includes a second number of heat sinks (collectively referenced 60), each of the heat sinks 60 positioned proximate a respective one of the switching devices $S_5$–$S_8$. The heat sinks 58, 60 are spaced sufficiently to allow an air flow 61 (FIG. 1) to pass therebetween for cooling.

Figure 5:
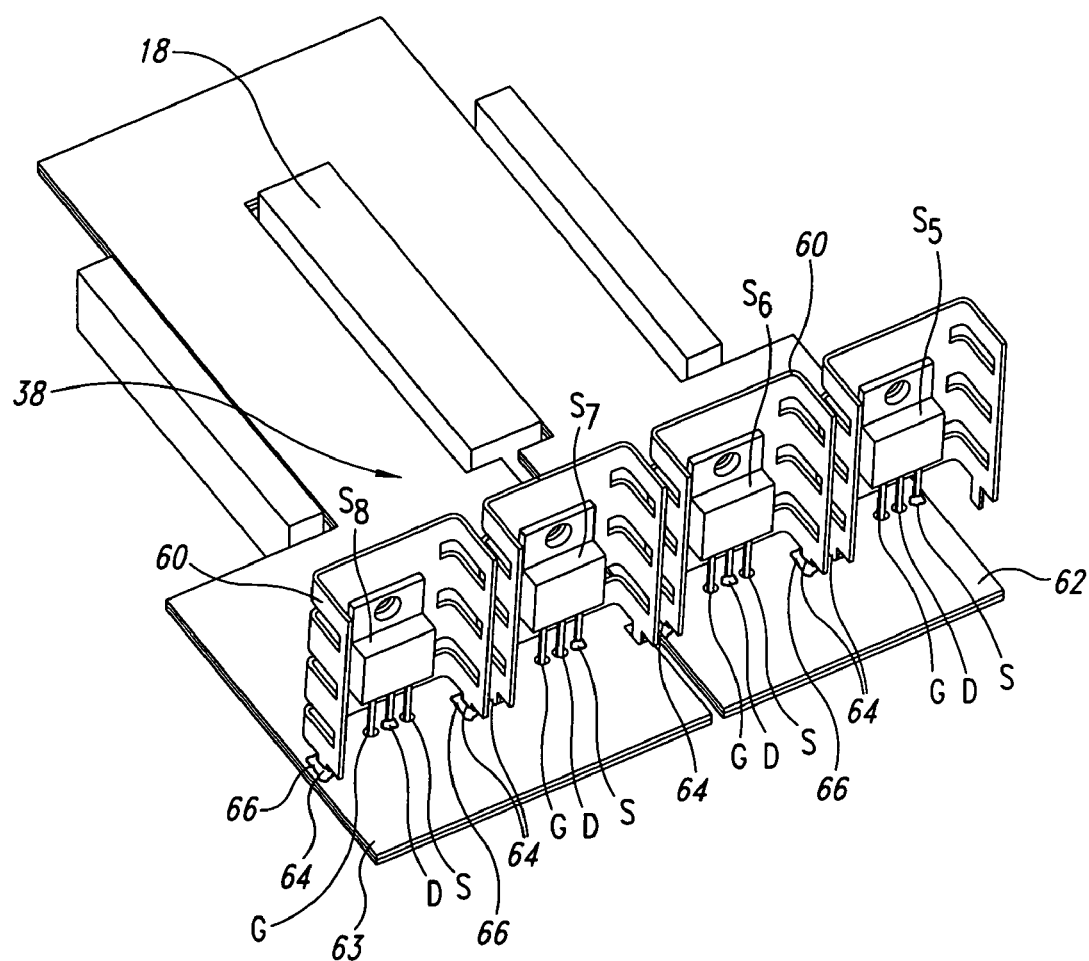
FIG. 5 is a partial isometric view illustrating a connection between some of the switching devices and a winding of the planar transformer.
Figure 6:
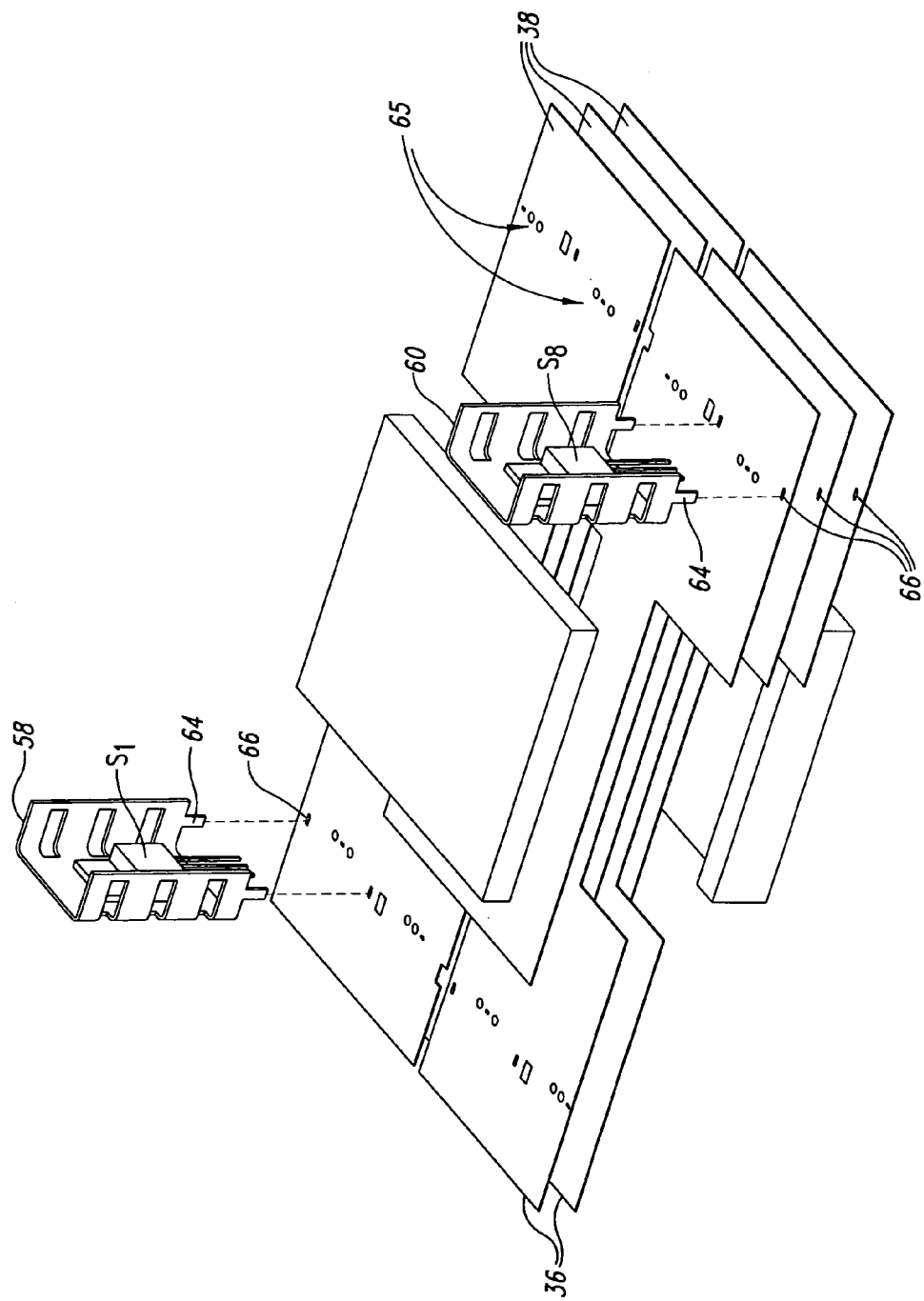
FIG. 6 is a partial, exploded isometric view showing the connection between some of the switching devices and primary and secondary windings of the planar transformer.

FIGS. 5 and 6 show a portion of the transformer 18, primary switching device $S_1$, secondary switching devices $S_5$–$S_8$, and associated heat sinks 58, 60.

The planar windings 36, 38 may be formed as one or more layers in the circuit board 12 (FIGS. 1–3).

The primary switching devices $S_1$–$S_4$ and the secondary switching devices $S_5$–$S_8$ each include leads G, S, D, corresponding to the gate or base, the source or emitter, and the drain or collector, respectively, depending on whether the switching devices $S_1$–$S_8$ are FETs or Bipolar Junction transistors (e.g., IGBTs).

With particular reference to FIG. 5, the gate/base leads G of each of the secondary switching devices $S_5$–$S_8$ pass through apertures or through-holes 65 to couple to the gate drive connecters 34 (FIG. 1) for receiving drive signals. The source/emitter lead S of the switching device $S_5$ and the drain/collector lead D of the switching device $S_6$ are each coupled to a first pole 62 of the secondary windings 38, for example via solder. The drain/collector lead D of the switching device $S_5$ and the drain/collector lead D of the switching device $S_6$ are each coupled to respective ones of the output ring terminals 22 via through-holes 65.

The source/emitter lead S of the switching device $S_7$ and the drain/collector lead D of the switching device $S_8$ are each coupled to a second pole 63 of the secondary windings 38, for example via solder. The drain/collector lead D of the switching device $S_7$ and the drain/collector lead D of the switching device $S_7$ are each coupled to respective ones of the output ring terminals 22 via through-holes 65.

Electrical coupling of the primary switching devices $S_1$–$S_4$ to the primary windings 36, input ring terminals 20, and gate drive connectors 28 employs a similar approach.

The heat sinks 58 proximate the lower primary switching devices $S_2$, $S_4$ are thermally conductively coupled to the primary winding 36 of the planar transformer 18. The heat sinks 60 proximate the lower secondary switching devices $S_6$, $S_8$ are thermally conductively coupled to at least one secondary winding 38 of the planar transformer 18. In particular, FIGS. 5 and 6 show fingers or tabs 64 extending from the heat sinks 60 of lower switching devices $S_6$ and $S_8$, that are received through apertures or through-holes 66 formed in the planar secondary windings 38, and soldered thereto. Likewise, fingers or tabs 64 of the heat sinks 58 of the lower switching devices $S_2$ and $S_4$ may be received through apertures or through-holes 66 formed in the planar primary windings 36, and soldered thereto. Thus, a cooling path is provided for the planar transformer 18 through at least some of the heat sinks 58, 60.

Figure 7:
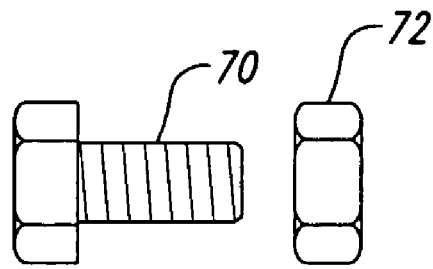
FIG. 7 is a side elevational view of a fastener in the form of a bolt and nut to provide a clamping force between a switching device and a heat sink to form a thermal path.

FIG. 7 shows a fastener in the form of a bolt 70 and nut 72 to provide a clamping force between the switches $S_1$–$S_8$ and the respective heat sinks 58, 60 to form conductive paths therebetween. The bolt 70 may be received through holes or openings formed in the switching devices $S_1$–$S_8$ and the heat sinks 58, 60. The nut 72 may be threadedly received on the bolt 70 to secure the bolt to the respective switching device $S_1$–$S_8$ and heat sink 58, 60.

Figure 8:
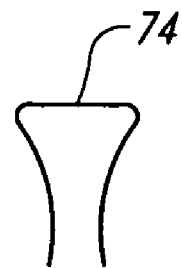
FIG. 8 is a side elevational view of a fastener in the form of a spring clip to provide a clamping force between a switching device and a heat sink to form a thermal path.

FIG. 8 shows a fastener in the form of a spring clip 74 to provide a clamping force between the switching devices $S_1$–$S_8$ and the respective heat sinks 58, 60 to form conductive paths therebetween. The spring clip 74 may be received about a portion of the switching devices $S_1$–$S_8$ and the heat sinks 58, 60. Other forms of clips may be used to bias the switching devices $S_1$–$S_8$ and the heat sinks 58, 60 together and/or to provide a thermally conductive path therebetween.

Figure 9:
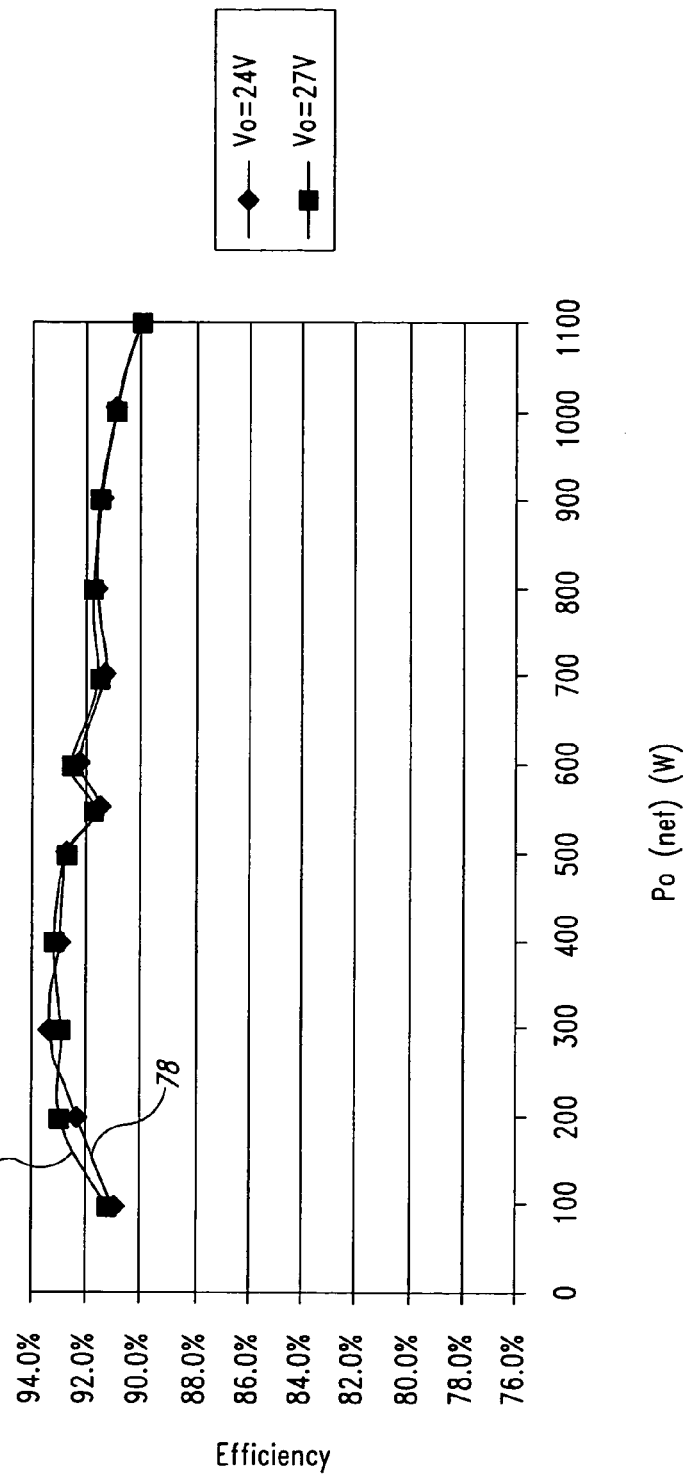
FIG. 9 is a graph showing efficiency in terms of percentage along an Y-axis and net power in terms of Watts along an X-axis for an exemplary power converter according to at least one embodiment.

FIG. 9 shows a graph of efficiency 76, 78 for first and second output voltages, respectively, in terms of percentage along an Y-axis and net power in terms of Watts along an X-axis for an exemplary power converter according to at least one embodiment for a first output voltage.

Although specific embodiments of and examples for the power converter and method of forming the same are described herein for illustrative purposes, various equivalent modifications can be made without departing from the spirit and scope of the invention, as will be recognized by those skilled in the relevant art. The teachings provided herein of the invention can be applied to power converters, not necessarily the full bridge boost power converter generally described above.

The various embodiments described above can be combined to provide further embodiments. All of the U.S. patents, U.S. patent application publications, U.S. patent applications, foreign patents, foreign patent applications and non-patent publications referred to in this specification and/or listed in the Application Data Sheet, including but not limited to U.S. Ser. No. 60/471,387, filed May 16, 2003, and entitled "POWER MODULE ARCHITECTURE," are incorporated herein by reference, in their entirety. Aspects of the invention can be modified, if necessary, to employ systems, circuits and concepts of the various patents, applications and publications to provide yet further embodiments of the invention.

These and other changes can be made to the invention in light of the above-detailed description. In general, in the following claims, the terms used should not be construed to limit the invention to the specific embodiments disclosed in the specification and the claims, but should be construed to include all power converters in accordance with the claims. Accordingly, the invention is not limited by the disclosure, but instead its scope is to be determined entirely by the following claims.

The invention claimed is:

1. A power converter, comprising:
   a circuit board;
   a planar transformer physically coupled to the circuit board, the planar transformer comprising a primary side and a secondary side and having at least a first edge and a second edge opposed to the first edge;
   a first set of switching devices forming a first full bridge circuit comprising a first, a second, a third and a fourth branch of the first full bridge circuit, at least one switching device in each branch mounted on the circuit board along at least a portion of the first edge of the planar transformer wherein the first and the second branch form a first leg of the first full bridge circuit and the third and the fourth branches form a second leg of the first full bridge circuit, and the switching devices of the first full bridge circuit are linearly arranged and ordered such that the switching devices in the first leg are successively adjacent one another and the switching devices in the second leg are successively adjacent one another; and
   a second set of switching devices forming a second full bridge circuit comprising a first, a second, a third and a fourth branch of the second full bridge circuit, at least a first switching device in each branch mounted on the circuit board along at least a portion of the second edge of the planar transformer.

2. The power converter of claim 1 wherein each of the first switching devices of the first, the second, the third and the fourth branches of the first bridge circuit are arranged in a line extending parallel to the first edge of the planar transformer.

3. The power converter of claim 1 wherein the first edge extends along the primary side of the transformer.

4. The power converter of claim 1 wherein each of the first, the second, the third and the fourth branches comprise at least a second switching device electrically coupled in parallel with a respective one of the first switching devices in the same branch of the first full bridge circuit, the second switching devices mounted on the circuit board in a line extending parallel to the first edge of the transformer.

5. The power converter of claim 1 wherein each of the first, the second, the third and the fourth branches of the first full bridge circuit comprise an equal number of switching devices, each of the switching devices in the first, the second, the third and the fourth branches electrically coupled in parallel with each of the other switching devices in the respective one of the branches, the switching devices mounted to the circuit board in parallel lines, where each of the lines comprises one of the switching devices from each of the first, the second, the third and the fourth branches and is parallel to the first edge of the transformer.

6. The power converter of claim 1, further comprising:
   a first number of heat sink structures, each of the heat sink structures in the first number of heat sinks proximate a respective one of the switching devices of the first full bridge circuit, at least one of the heat sink structures thermally conductively coupled to at least the primary side of the planar transformer.

7. The power converter of claim 1, further comprising:
   a first number of heat sinks, each of the heat sinks in the first number of heat sinks proximate a respective one of the switching devices of the first full bridge circuit, at least one of the heat sinks thermally conductively coupled to at least the primary side of the planar transformer; and
   a second number of heat sinks, each of the heat sinks in the second number of heat sinks proximate a respective one of the switching devices of the second full bridge circuit, at least one of the heat sinks thermally conductively coupled to at least the secondary side of the planar transformer.

8. The power converter of claim 1 wherein the primary side of the planar transformer comprises at least two conductive layers, and at least one of the heats sinks are thermally conductively coupled to at least the two conductive layers of the primary side of the transformer.

9. The power converter of claim 1 wherein the first and the second branch form a first leg of the second full bridge circuit and the third and the fourth branches form a second leg of the second full bridge circuit, and the switching devices of the second full bridge circuit are linearly arranged and ordered such that the switching devices in the first leg are successively adjacent one another and the switching devices in the second leg are successively adjacent one another.

10. A power converter, comprising:
    a circuit board;
    a planar transformer physically coupled to the circuit board, the planar transformer comprising a primary side and a secondary side and having at least a first edge and a second edge opposed to the first edge; and
    a first full bridge circuit comprising a left half upper branch, a left half lower branch, a right half upper branch and a right half lower branch, the left half upper branch comprising at least a first left half upper branch switching device, the left half lower branch comprising at least a first left half lower branch switching device, the right half upper branch comprising at least a first right half upper branch switching device and the right half lower branch comprising at least a first right half lower branch switching device, each of the first left half upper branch switching device, the first left half lower branch switching device, the first right half upper branch switching device and the first right half lower branch switching device of the first full bridge circuit are carried by the circuit board in a first primary side line extending parallel to the first edge of the planar transformer.

11. The power converter of claim 10 wherein the first left half upper switching device and the first right half upper switching device are adjacent one another such that there are not intervening switching devices and where the first right half upper switching device and the first right half lower switching device are adjacent one another such that there are no intervening switching devices.

12. The power converter of claim 10 wherein at least one of: a) the first left half upper switching device and the first right half upper switching device of the first full bridge circuit are not immediately adjacent one another along the first primary side line, or b) the first left half lower switching device and the first right half lower switching device of the first full bridge circuit are not immediately adjacent one another along the first primary side line.

13. The power converter of claim 10 wherein the left half upper branch further comprises at least a second left half upper branch switching device electrically coupled in parallel with the first left half upper branch switching device, the left half lower branch further comprises at least a second left half lower branch switching device electrically coupled in parallel with the first left half lower branch switching device, the right half upper branch further comprises at least a second right half upper branch switching device electrically coupled in parallel with the first right half upper branch switching device, and the right half lower branch further comprises at least a second right half lower branch switching device electrically coupled in parallel with the first right half lower branch switching device, each of the second left half upper branch switching device, the second left half lower branch switching device, the second right half upper branch switching device and the second right half lower branch switching device of the first full bridge circuit are carried by the circuit board in a second primary side line extending parallel to the first primary side line and spaced outwardly therefrom with respect to the first edge of the planar transformer.

14. The power converter of claim 10 wherein the left half upper branch further comprises at least a second and a third left half upper branch switching devices electrically coupled in parallel with the first left half upper branch switching device, the left half lower branch further comprises at least a second and a third left half lower branch switching devices electrically coupled in parallel with the first left half lower branch switching device, the right half upper branch further comprises at least a second and a third right half upper branch switching devices electrically coupled in parallel with the first right half upper branch switching device, and the right half lower branch further comprises at least a second and a third right half lower branch switching devices electrically coupled in parallel with the first right half lower branch switching device, each of the second left half upper branch switching device, the second left half lower branch switching device, the second right half upper branch switching device and the second right half lower branch switching device of the first full bridge circuit are carried by the circuit board in a second primary side line extending parallel to the first primary side line and spaced outwardly therefrom with respect to the first edge of the planar transformer and each of the third left half upper branch switching device, the third left half lower branch switching device, the third right half upper branch switching device and the third right half lower branch switching device of the first full bridge circuit are carried by the circuit board in a third primary side line extending parallel to the second primary side line and spaced outwardly therefrom with respect to the first edge of the planar transformer.

15. The power converter of claim 10, further comprising:
a second full bridge circuit comprising a left half upper branch, a left half lower branch, a right half upper branch and a right half lower branch, the left half upper branch comprising at least a first left half upper branch switching device, the left half lower branch comprising at least a first left half lower branch switching device, the right half upper branch comprising at least a first right half upper branch switching device and the right half lower branch comprising at least a first right half lower branch switching device, each of the first left half upper branch switching device, the first right half upper branch switching device and the first right half lower branch switching device of the second full bridge circuit are carried by the circuit board in a first secondary side line extending parallel to the second edge of the planar transformer.

16. The power converter of claim 10, further comprising:
a second full bridge circuit comprising a left half upper branch, a left half lower branch, a right half upper branch and a right half lower branch, the left half upper branch comprising at least one left half upper branch switching device, the left half lower branch comprising at least one left half lower branch switching device, the right half upper branch comprising at least one right half upper branch switching device and the right half lower branch comprising at least one right half lower branch switching device, each of the left half upper branch switching device, the left half lower branch switching device, the right half upper branch switching device and the right half lower branch switching device of the second full bridge circuit are carried by the circuit board in a first secondary side line extending parallel to the second edge of the planar transformer, wherein at least one of: a) the left half upper switching device and the right half upper switching device of the second full bridge circuit are not immediately adjacent one another along the first secondary side line, or b) the left half lower switching device and the right half lower switching device of the second full bridge circuit are not immediately adjacent one another along the first secondary side line.

17. The power converter of claim 10, further comprising:
a second full bridge circuit comprising a left half upper branch, a left half lower branch, a right half upper branch and a right half lower branch, the left half upper branch comprising at least a first and a second left half upper branch switching devices, the left half lower branch comprising at least a first and a second left half lower branch switching devices, the right half upper branch comprising at least a first and a second right half upper branch switching devices, and the right half lower branch comprising at least a first and a second right half lower branch switching devices, each of the first left half upper branch switching device, the first left half lower branch switching device, the first right half upper branch switching device and the first right half lower branch switching device of the second full bridge circuit are carried by the circuit board in a first secondary side line extending parallel to the second edge of the planar transformer and each of the second left half upper branch switching device, the second left half lower branch switching device, the second right half upper branch switching device and the second right half lower branch switching device of the second full bridge circuit are carried by the circuit board in a second secondary side line extending parallel to the first secondary side line and spaced outwardly therefrom with respect to the planar transformer.

18. The power converter of claim 10, further comprising:
a second full bridge circuit comprising a left half upper branch, a left half lower branch, a right half upper branch and a right half lower branch, the left half upper branch comprising at least a first, a second and a third left half upper branch switching devices, the left half lower branch comprising at least a first, a second and a third left half lower branch switching devices, the right half upper branch comprising at least a first, a second and a third right half upper branch switching devices, and the right half lower branch comprising at least a first, a second, and a third right half lower branch switching devices, each of the first left half upper branch switching device, the first left half lower branch switching device, the first right half upper branch switching device and the first right half lower branch switching device of the second full bridge circuit are carried by the circuit board in a first secondary side line extending parallel to the second edge of the planar transformer, each of the second left half upper branch switching device, the second left half lower branch switching device, the second right half upper branch switching device and the second right half lower branch switching device of the second full bridge circuit are carried by the circuit board in a second secondary side line extending parallel to the first secondary side line and spaced outwardly therefrom with respect to the planar transformer, and each of the third left half upper branch switching device, the third left half lower branch switching device, the third right half upper branch switching device and the third right half lower branch switching device of the second full bridge circuit are carried by the circuit board in a third secondary side line extending parallel to the second secondary side line and spaced outwardly therefrom with respect to the planar transformer.

19. The power converter of claim 10, further comprising:
a housing enclosing the circuit board, the planar transformer and the first full bridge circuit.

20. A method of forming a power converter, the method comprising:
mounting a planar transformer to a circuit board, the planar transformer having a primary, a secondary, and at least a first edge and a second edge; and
mounting at least a first left half upper branch switching device, a first left half lower branch switching device, a first right half upper branch switching device and a first right half lower branch switching device on the circuit board in a line extending parallel to the first edge of the planar transformer, the first left half upper branch switching device, the first left half lower branch switching device, the first right half upper branch switching device and the first right half lower branch switching device electrically coupled to form a first full bridge circuit electrically coupled to the primary of the planar transformer.

21. The method of claim 20 wherein mounting at least a first left half upper branch switching device, a first left half lower branch switching device, a first right half upper branch switching device and a first right half lower branch switching device on the circuit board in a line extending parallel to the first edge of the planar transformer comprises mounting at least the first left half upper branch switching device, the first left half lower branch switching device, the first right half upper branch switching device and the first right half lower branch switching device on the circuit board such that at least one of: a) the first left half upper switching device and the first right half upper switching device of the first full bridge circuit are not immediately adjacent one another along the first primary side line, or b) the first left half lower switching device and the first right half lower switching device of the first full bridge circuit are not immediately adjacent one another along the first primary side line.

22. The method of claim 20, the method further comprising:
mounting at least a first left half upper branch switching device, a first left half lower branch switching device, a first right half upper branch switching device and a first right half lower branch switching device on the circuit board in a line extending parallel to the second edge of the planar transformer, the first left half upper branch switching device, the first left half lower branch switching device, the first right half upper branch switching device and the first right half lower branch switching device electrically coupled to form a second full bridge circuit electrically coupled to the secondary of the planar transformer.

23. The method of claim 20, the method further comprising:
mounting at least a first left half upper branch switching device, a first left half lower branch switching device, a first right half upper branch switching device and a first right half lower branch switching device on the circuit board in a second line extending parallel to the second edge of the planar transformer, the first left half upper branch switching device, the first left half lower branch switching device, the first right half upper branch switching device and the first right half lower branch switching device electrically coupled to form a second full bridge circuit electrically coupled to the secondary of the planar transformer, the first left half upper branch switching device, the first left half lower branch switching device, the first right half upper branch switching device and the first right half lower branch switching device of the second full bridge circuit mounted to the circuit board such that at least one of: a) the first left half upper switching device and the first right half upper switching device of the second full bridge circuit are not immediately adjacent one another along the second line, or b) the first left half lower switching device and the first right half lower switching device of the second full bridge circuit are not immediately adjacent one another along the second line.

24. A power converter, comprising:
a circuit board;
a planar transformer carried by the circuit board, the planar transformer comprising a primary side of a number of planar primary windings and a secondary side of a number of planar secondary windings;
a first set of switching devices carried by the circuit board and electrically coupled to form a first bridge circuit, the first set of switching devices electrically coupled to the primary side of the planar transformer; and
a first set of heat sink structures carried by the circuit board and located proximate respective ones of the switching devices in the first set of switching devices, at least a number of the heat sink structures thermally conductively coupled to at least one of the number of planar primary windings.

25. The power converter of claim 24 wherein each of the number of heat sink structures in the first set of heat sink structures is thermally conductively coupled to the respective one of the switching devices in the first set of switching devices.

26. The power converter of claim 24 wherein each of the number of heat sink structures in the first set of heat sink structures is thermally conductively coupled to at least two of the number of planar primary windings.

27. The power converter of claim 24 wherein each of the number of heat sink structures in the first set of heat sink structures is thermally conductively coupled to at least two of the number of planar primary windings via solder.

28. The power converter of claim 24 wherein each of the number of heat sink structures in the first set of heat sink structures is thermally conductively coupled to the respective one of the switching devices via a respective one of a number of spring clips.

29. The power converter of claim 24 wherein each of the number of heat sink structures in the first set of heat sink structures is thermally conductively coupled to the respective one of the switching devices via a respective one of a number of bolts.

30. The power converter of claim 24 wherein the first set of switching devices comprises at least a first left half upper branch switching device, at least a first left half lower branch switching device, at least a first right half upper branch switching device, and at least a first right half lower branch switching device, each of the first left half upper branch switching device, the first left half lower branch switching device, the first right half upper branch switching device, and the first right half lower branch switching device electrically coupled to one another such that the first bridge circuit is a first full bridge circuit.

31. The power converter of claim 24 wherein the first set of switching devices comprises at least a first and a second left half upper branch switching devices electrically coupled to one another in parallel, at least a first and a second left half lower branch switching devices electrically coupled to one another in parallel, at least a first and a second right half upper branch switching devices electrically coupled to one another in parallel, and at least a first and a second right half lower branch switching devices electrically coupled to one another in parallel, each of the first left half upper branch switching device, the first left half lower branch switching device, the first right half upper branch switching device, and the first right half lower branch switching device carried on the circuit board in a first line extending parallel to a first edge of the planar transformer and each of the second left half upper branch switching device, the second left half lower branch switching device, the second right half upper branch switching device, and the second right half lower branch switching device carried on the circuit board in a second line extending parallel to the first line and spaced outwardly therefrom with respect to the first edge of the planar transformer to provide an air flow path between the heat sinks proximate the switching devices in the first line and the heat sinks proximate the switching devices in the second line.

32. The power converter of claim 24 wherein the heat sink structures in the first set of heat sink structures are spaced from one another to provide air flow paths therebetween.

33. The power converter of claim 24, further comprising:
a second set of switching devices carried by the circuit board and electrically coupled to form a second bridge circuit, the second set of switching devices electrically coupled to the secondary side of the planar transformer; and
a second set of heat sink structures carried by the circuit board and located proximate respective ones of the switching devices in the second set of switching devices, at least a number of the heat sink structures thermally conductively coupled to at least one of the number of planar secondary windings.

34. The power converter of claim 24, further comprising:
a second set of switching devices carried by the circuit board and electrically coupled to form a second bridge circuit, the second set of switching devices electrically coupled to the secondary side of the planar transformer; and
a second set of heat sink structures carried by the circuit board and located proximate respective ones of the switching devices in the second set of switching devices, at least a number of the heat sink structures thermally conductively coupled to at least one of the number of planar secondary windings, wherein each of the number of heat sink structures in the second set of heat sink structures is thermally conductively coupled to the respective one of the switching devices in the second set of switching devices.

35. The power converter of claim 24, further comprising:
a second set of switching devices carried by the circuit board and electrically coupled to form a second bridge circuit, the second set of switching devices electrically coupled to the secondary side of the planar transformer; and
a second set of heat sink structures carried by the circuit board and located proximate respective ones of the switching devices in the second set of switching devices, at least a number of the heat sink structures thermally conductively coupled to at least one of the number of planar secondary windings wherein each of the number of heat sink structures in the second set of heat sink structures is thermally conductively coupled to at least two of the number of planar secondary windings.

36. A power converter, comprising:
a circuit board;
a planar transformer carried by the circuit board, the planar transformer comprising a number of planar primary windings and a number of planar secondary windings;
a first set of switching devices carried by the circuit board and electrically coupled to form a circuit, the first set of switching devices electrically coupled to the planar primary windings of the planar transformer;
a second set of switching devices carried by the circuit board and electrically coupled to form a second circuit, the second set of switching devices electrically coupled to the planar secondary windings of the planar transformer; and
a number of heat sink structures carried by the circuit board and located proximate respective ones of the switching devices in the first and the second sets of switching devices, a first number of the heat sink structures proximate the first set of switching devices thermally conductively coupled to at least one of the number of the planar primary windings and a second number of the heat sink structures proximate the second set of switching devices thermally conductively coupled to at least one of the number of the planar secondary windings.

37. The power converter of claim 36 wherein the planar primary windings and the planar secondary windings are formed as conductive traces on a number of layers forming the circuit board.

38. The power converter of claim 36 wherein each of the number of heat sink structures in the first set of heat sink structures is coupled to at least two of the number of planar primary windings.

39. The power converter of claim 36 wherein each of the number of heat sink structures is thermally conductively coupled to at least two of the number of planar primary windings via solder connections in through holes formed in the circuit board.

40. The power converter of claim 36 wherein each of the number of heat sink structures is thermally conductively coupled to the respective one of the switching devices via a respective one of a number of spring clips.

41. The power converter of claim 36 wherein each of the number of heat sink structures is thermally conductively coupled to the respective one of the switching devices via a respective one of a number of bolts.

42. A method of forming a power converter, the method comprising:

mounting a planar transformer to a circuit board, the planar transformer having a planar primary windings, a secondary planar windings, and at least a first edge and a second edge;

mounting a first set of switching devices to the circuit board, the first set of switching devices coupled to the planar primary windings of the planar transformer;

mounting a second set of switching devices to the circuit board, the second set of switching devices coupled to the planar secondary windings of the planar transformer;

mounting a number of heat sink structures to the circuit board proximate a respective ones of the switching devices in the first and the second sets of switching devices, a first number of the heat sink structures proximate the first set of switching devices thermally conductively coupled to at least one of the number of the planar primary windings and a second number of the heat sink structures proximate the second set of switching devices thermally conductively coupled to at least one of the number of the planar secondary windings.

43. The method of claim 42 wherein mounting a number of heat sink structures to the circuit board comprises thermally conductively coupling each of the number of heat sink structures in the first set of heat sink structures to at least two of the number of planar primary windings and thermally conductively coupling each of the number of heat sink structures in the second set of heat sink structures to at least two of the number of planar secondary windings.

44. The method of claim 42, further comprising:

providing a thermally conductive physical connection between a number of the heat sink structures and the respective one of the switching devices.

* * * * *